(12) United States Patent
Dong

(10) Patent No.: US 6,476,608 B1
(45) Date of Patent: Nov. 5, 2002

(54) COMBINING SEISMIC WAVES WITH SEISMOELECTRICS TO PERFORM PROSPECTING AND MEASUREMENTS

(76) Inventor: Chi Dong, 5575 Holland Dr., Arvada, CO (US) 80002

( * ) Notice: Subject to any disclaimer, the term of this patent is extended or adjusted under 35 U.S.C. 154(b) by 0 days.

(21) Appl. No.: 09/270,192

(22) Filed: Mar. 14, 1999

Related U.S. Application Data
(60) Provisional application No. 60/078,020, filed on Mar. 13, 1998.

(51) Int. Cl.[7] ................................................ G01V 1/00
(52) U.S. Cl. ......................... 324/323; 324/347; 367/14
(58) Field of Search ................................. 324/323, 334, 324/347, 353, 344; 702/14, 2; 367/38, 14

(56) References Cited

U.S. PATENT DOCUMENTS

| | | | |
|---|---|---|---|
| 3,599,085 A | | 8/1971 | Semmelink .................... 324/1 |
| 4,427,944 A | | 1/1984 | Chandler ..................... 324/353 |
| 4,742,402 A | | 5/1988 | Sobelev et al. ................. 360/6 |
| 4,904,942 A | * | 2/1990 | Thompson ................... 324/323 |
| 5,417,104 A | | 5/1995 | Wong ............................. 73/38 |
| H1524 H | * | 4/1996 | Thompson et al. .......... 324/334 |
| 5,503,001 A | | 4/1996 | Wong ............................. 73/38 |
| 5,903,153 A | * | 5/1999 | Clarke et al. ................ 324/323 |

OTHER PUBLICATIONS

Using Finite Difference Numerical Models of Visco–Elastic Seismic Waveforms to Model Seismoelectrics, CHI,DONG, (Unpublished Thesis). Relevant Pages: All.

Permeability Dependence of Streaming Potential in Rocks for Various Fluid Conductivities, Laurence Jouniaux, Pozzi, Jean–Pierre, 1995, Relevant Pages: pp. 485–488.

Porosities Permeability and Electro–kinetic Phenomena Wong, Po–Zen, Pengra, David (Date Unknown) Relevant Pages: p. 23. Published by University of Massachusetts.

* cited by examiner

Primary Examiner—Jay Patidar
(74) Attorney, Agent, or Firm—The Law Office of Craig W. Barber

(57) ABSTRACT

A method and apparatus for low cost, convenient prospecting and surveys of subsurface structures using seismoelectric signals, as well as laboratory analysis of geological samples. The seismoelectric signals come from seismic waves generated by sources which can be applied or natural. The seismoelectric signals are generated with the same velocity and frequency of the generating seismic waves, then induce secondary electromagnetic signals which travel at their own much higher speed. The seismoelectric signals thus may be measured with electrodes or antennas. Electrodes may be disposed within a borehole or on the surface. The method allows use of geophone data, but does not require it. The it source of the seismoelectric signals, being a moving seismic wave front, conveys continuous, whole body information on the structures underground, in much the same way as seismic ware data, but in the form of simpler, easier to capture seismoelectric signals. Reflection and refraction of seismic waves can be ascertained. The method also can be used to determine permeability and water table level. The measurement does not require use of signal phase, nor geophones nor multi-chambered pressure oscillators.

16 Claims, 18 Drawing Sheets a) Pendulum Seismoelectric date b) 0.007 Exp[-0.2x]Sin[5.2x+4.41]

c) Compare a) with b)

COMBINING SEISMIC WAVES WITH SEISMOELECTRICS TO PERFORM PROSPECTING AND MEASUREMENTS

CROSS REFERENCE TO RELATED APPLICATIONS

This application is entitled to the benefit of Provisional Patent Application Serial Number 60/078,020 filed Mar. 13, 1998.

STATEMENT REGARDING FEDERALLY SPONSORED RESEARCH AND DEVELOPMENT

Not Applicable.

BACKGROUND OF THE INVENTION

1. Field of the Invention

This invention relates to a method and apparatus for prospecting and geophysical surveying using seismoelectric signals. This can be used for a geophysical survey, either at the surface, above the surface, in a borehole, or in the laboratory. One feature of the invention is that the seismic wave source may be artificial or natural. The method of the invention then analyzes the seismoelectric signal utilizing the relationship that the seismoelectric signal's source travels with seismic wave velocity and frequency and carries information about underground formations. The invention can thus be used for survey of underground formations and also, in particular for of permeability. Alone or when combined with the seismic wave data, seismoelectric signals provide a more detailed and less costly geophysical survey.

2. Description of Related Art

The traditional seismic survey uses geophones, essentially very sensitive geophones placed in contact with the earth's surface or the walls of boreholes in order to capture seismic signals (vibrations in the medium) which are generated by any of a variety of sources, natural, and artificial. These surveys have a number of disadvantages: complexity, cost, and the fact that the geophones must receive a certain threshold value of seismic signal in order to be activated and record the signal.

Low frequency electric signals have been known to propagate through the Earth's crust for some time. The sources of these signals are numerous. Geotelluric signals are caused by geological reactions within the Earth. The telluric signal is caused by the solar wind, a steady flow of electrically charged particles emanating from the sun. Seismoelectric signals are caused by the interaction of a geological matrix such as permeable earth material, and water within it, under the effect of a seismic disturbance. Other causes of low frequency subterranean electrical signals are also known.

These various types of signals have been hopefully examined by surveyors for decades, without any useful theoretical basis for scientific analysis of the results.

In the realm of more specific and scientifically verifiable known methods, there are several patents which teach use of streaming potential in measurement of permeability of geological samples.

Streaming potential is the electrical potential (voltage) generated by water flowing in a solid matrix such as permeable rock. The opposite effect, electro-osmosis, is the generation of water flow or water pressure in a permeable matrix by application of an electrical potential across the matrix.

U.S. Pat. No. 3,599,085 teaches use of a sonic transducer periodically exciting a formation (matrix) at low frequencies to cause periodic electrokinetic potentials which are measured at a location near to the transducer and at a location spaced from the transducer, the ratio of the measured potential being related to the electrokinetic skin depth to provide an indication of the permeability of the formation. U.S. Pat. No. 4,427,944 teaches application of pressure of alternating polarity to the matrix and measurement of the generated transient streaming potential in the time domain to estimate the characteristic response time of the matrix. U.S. Pat. No. 5 4,742,402 teaches the building of a seismoelectric signal recording device. Finally, U.S. Pat. No. 5,417,104 and its continuation, U.S. Pat. No. 5,503,001, teach determination of permeability of porous media and thickness of mudcake on the walls of boreholes and thin porous media by measuring at a finite frequency streaming potential induced in such thin layers by finite frequency pressure oscillations. This method uses multi-chambered apparatus, requires that the electrodes all be quite close to the source of the pressure oscillations, and requires measurement of the extremely small phase shift between the components of the streaming potential signal.

These methods also appear to lack data handling methodology based on an understanding of the nature of the propagation of seismoelectric signals, as follows. The streaming potential creates a seismoelectric signal, energized by the passage of a seismic wave. A secondary electromagnetic field is induced by the seismoelectric signal, which can be detected in its proximity. The source of the seismoelectric signal is the passage of the seismic wave, and the seismoelectric signal source thus betrays the location, velocity and frequency of the seismic wave. Since the known methods do not teach that seismoelectric signals are propagated at the velocity and frequency of the seismic wave, they also do not point to convenient, low cost methods for using seismoelectric signals for surveys in a wide variety of environments: boreholes, on the surface, above the surface, or in the lab. Furthermore, seismoelectric signals are related not only to permeability and resistivity, but also to seismic wave forms dependant upon the P-wave (compression) and S-wave (shear) velocities. As a result, the known art methods are limited to special cases such as lab work, limited geological formations or determination of the thickness of mudcake in a borehole.

SUMMARY OF THE INVENTION

It is one object of this invention to overcome many of the disadvantages of known streaming potential measurement methods.

It is another object of this invention to provide a method of geophysical surveying which does not require a threshold value of seismic signal in order for the seismic signal to be detectable.

It is another object of this invention to provide a method of use of the relationship between seismic waves and seismoelectric signals in seismoelectric surface prospecting.

It is another object of this invention to provide a method of use of the relationship between seismic waves and seismoelectric signals in streaming potential measurements inside a borehole to evaluate permeability.

It is another object of this invention to provide a method to detect three dimensional seismic wave signals using an aerial antenna instead of geophones.

It is another object of this invention to provide a simple, low cost method for conducting accurate and quantifiable geophysical borehole surveys and geophysical borehole prospecting.

It is another object of this invention to provide a simple, low cost method for conducting accurate and quantifiable geophysical aerial surveys and geophysical aerial prospecting.

It is another object of this invention to provide a simple, low cost method for conducting accurate and quantifiable laboratory testing of geological samples.

It is yet another object of this invention to provide a low cost method for accurate, quantifiable surveying without use of expensive equipment.

It is yet another object of this invention to provide simple, low cost apparatus for conducting accurate and quantifiable geophysical surface surveys and geophysical surface prospecting.

It is yet another object of this invention to provide simple, low cost apparatus for conducting accurate and quantifiable geophysical aerial surveys and geophysical aerial prospecting.

It is yet another object of this invention to provide a method to carry out seismoelectric prospecting using natural seismic sources.

It is yet another object of this invention to provide simple, low cost apparatus for conducting accurate and quantifiable laboratory testing of geophysical samples.

It is yet another object of this invention to provide simple, low cost apparatus for locating a subterranean water table.

In general, the method of the invention uses the nature of propagation of seismic waves and the generation of seismoelectric signals by those waves to map subsurface features and permeability data. As a seismic wave travels through a water permeated subsurface matrix of earth materials, it generates seismoelectric signals. Previous researchers in the field did not realize that the data received showed that the seismoelectric signal was being generated at the same velocity and frequency as the seismic wave generating it. The seismoelectric signal then radiates (at the considerably greater velocity of a subterranean electromagnetic signal) away from that point of generation, while the seismic wave continues to generate new seismoelectric signals as it travels through the subsurface terrain. In the method of the invention, these seismoelectric signals are captured in the time and frequency domains by at least one pair of electrodes. The information they capture can then be analyzed using the method of the invention to tell the velocity and frequency of the original seismic wave. The propagation of seismic waves is relatively well understood, and the velocity and frequency data from that wave can be used to determine the subsurface topology, using methods well known in the art.

Compared to older, traditional, geophone surveying, the method is cheaper, more convenient, uses less complex A machinery, and, since the seismoelectric signals follow Ohm's law, is very sensitive, not having a minimum threshold value for detection.

BRIEF DESCRIPTION OF THE FIGURES

The above objects and advantages of this invention will become further apparent upon reading the detailed description of the preferred embodiment and alternative embodiments of the invention, with reference to the drawings. In brief.

DESCRIPTION OF THE INVENTION

Figure 1:
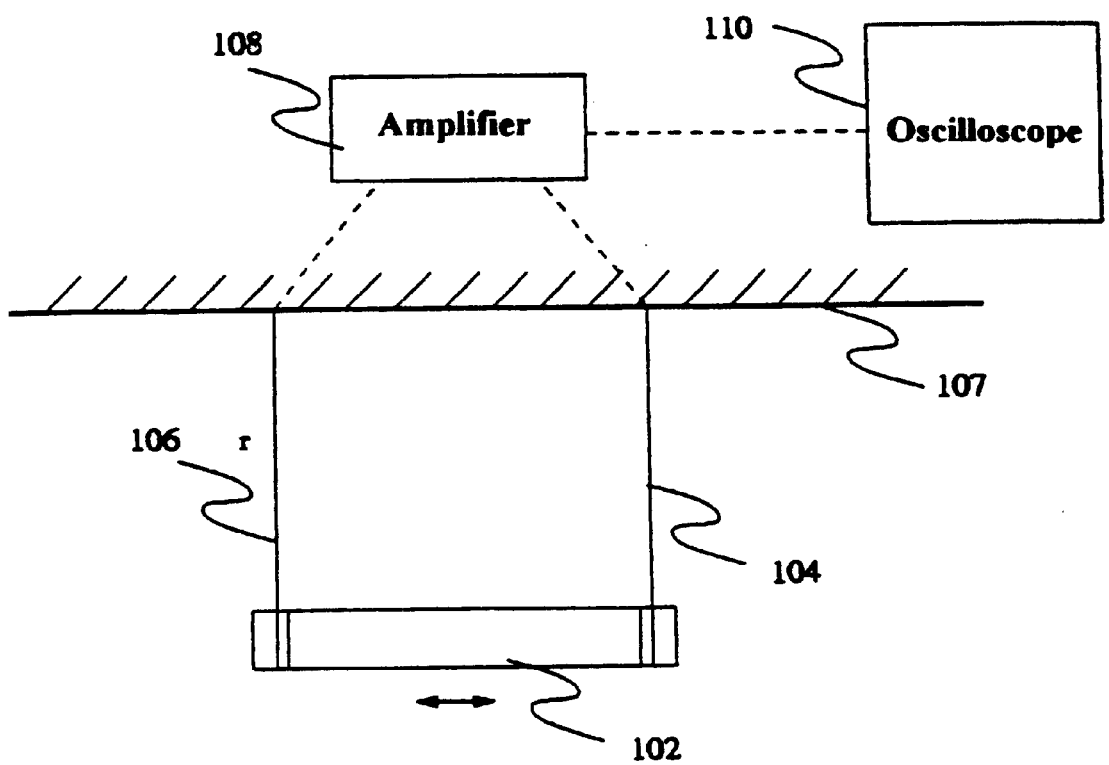
FIG. 1 is a diagram showing the apparatus for a pendulum seismoelectric analysis in the laboratory.

The first consideration for a practical application of seismoelectrics is the nature of the propagation of seismoelectric signals. A seismoelectric signal is the streaming potential produced by the propagation of seismic waves inside a water-saturated medium such as earth materials. A seismoelectric signal exhibits the velocity and frequency of the propagating seismic wave.

The source of a seismic signal can be a single controlled explosion, as is often used in known geophysical surveying methods, or an impact or another source. After such an event, a dynamic field is set up. Inside this dynamic field, a seismic wave is propagated from the source in all directions. The propagation of the seismic wave inside a water-saturated earth material causes a relative displacement of water and rock, and this tiny relative displacement is the source of the seismoelectric signal. The source of the seismoelectric signal is moving along with the seismic waveform as it spreads out from the seismic source; therefore they have the same velocity. The principle that seismoelectric signal propagation corresponds with seismic wave velocity can be understood by comparison with the phenomenon of headlight traces of cars running along a highway. The car is the seismic wave, the light is the seismoelectric signal it generates. One could plot the position of the car by plotting the position across time of the light source, the headlights. One can plot the position of the seismic wave by plotting the position across time of the seismoelectric signal source. After the seismoelectric signal is produced, it induces a secondary electromagnetic field. The source of the seismoelectric signals, the seismic wave, is traveling at a relatively slow speed of around 2 km/second, which is naturally far less than the secondary electromagnetic field speed. It is the speed of the seismic wave which is of interest in prospecting.

Well known techniques used over many years allow researchers to determine the structures below the surface of the Earth based upon the motions of seismic waves. This invention provides a better method of determining seismic wave motions.

In more detail, the theory is as follows.

In a water-saturated matrix, the differing physical properties of the water and the solid matrix result in the creation of electrical double layers. The surface layer of the solid material naturally acquires one charge, while the surface layer of the water naturally acquires the opposite polarity of electrical charge. In the water, this first charged layer is held in immobile contact with the solid material. This immobile layer has been defined in the art as being the compact or inner region very near the wall of the matrix, in which the charge and potential distribution are determined chiefly by the geometrical restrictions of ion and molecule size and the short range interactions between ions, the wall surface and the adjoining dipoles, and layers of water further from the surface. This layer ends up essentially attached to the wall surface and its properties end up being similar to those of the solid matrix. As the distance from the surface increases, the charge in the water decreases. This zone of decreasing charge is called the diffuse layer. Momentum is conserved normally between these layers as seismic waves pass through them, the product of mass and velocity of each layer (momentum) being necessarily equal to that of the next layer. Differing masses of rock and water then require differing velocities in rock and water in order to conserve the momentum, and the streaming potential is generated by the pressure caused by the relative velocities. The resulting sources of seismoelectric signals are subject to all the same alterations as usually occur to seismic waves: reflection, refraction and so on. Note also, the water table will cause a difference in the seismoelectric signals as it is crossed, allowing easy location of the water table.

When a seismic wave travels in water-saturated earth materials, there are three movements at the particle level that relate to the seismoelectric signals: rock movement, water movement and electric charge movement. In a seismic wave field, rock movement causes water movement. Relative movement between water and rock disturbs the electrical double layers which in turn produce electric charge movement. Thus, the seismoelectric signal results from the movement of the electric charges. Rock movement is the source of both water movement and electric charge movement. Therefore seismoelectric signals velocity and frequency depend directly on the seismic wave.

In addition, there are tiny phase shifts between rock displacement, water displacement, and the resulting streaming potential, these are known and used in the prior art but use and calculation of these tiny quantities is not necessary to practice the present invention.

In the laboratory, the seismoelectric theory is tested by suspending a cylindrical rock sample by two electrode wires, so that it formed a pendulum. The force from the rock is coupled through the double layers to the water. The coupling from the rock to the water follows the conservation of momentum. Due to the different density between rock and water there is a pressure difference between rock and water called equivalent pressure. As the pendulum rock sample is swung, conservation of momentum generates the pressure difference between rock and water which generates the streaming potential. The streaming potential signal then becomes a function of both time and two dimensional space, and generates an electromagnetic trace which matches in velocity and frequency the pendulum motion: an attenuated sine curve.

The equivalent pressure acting on the water inside of a rock sample depends on the density difference of the water and the rock sample. If the pendulum movement has high frequency or high velocity, the pressure difference variations on the amplitude and frequency are greater than the limited frequency values found in known art. The water fluid inside of a porosity in such a case will be turbulent rather than laminar, although this lies outside the scope of this patent.

In the conceptual model, the pendulum motion becomes one particle's displacement inside of the wave field of a seismic wave. The streaming potential becomes a function of time and 3-D space, and shows its seismoelectric signal character by traveling with the seismic wave velocity and frequency.

Seismic waves propagate in solids as patterns of particle deformation traveling through the material, with velocity dependent on the elastic properties and densities of the material. In a compression or P-wave, the motion of the particles is always in the direction of wave propagation. In a shear or S-wave, the motion of individual particles is always perpendicular to the direction of wave propagation.

In a seismic wave field, when waves propagate inside of the water saturated rocks, the force from rocks coupling to the water produces equivalent pressure, and this equivalent pressure produces seismoelectric signals.

A seismoelectric signal, the streaming potential, may contain useful information regarding geophysical properties, including permeability.

Field surveys verify the laboratory analysis and the conceptual model. Analysis of the results of previous surveys reveals that in fact, this conceptual relationship between seismoelectric signals and seismic signals has been hinted at, without any awareness of this fact by researchers. Based upon this knowledge, it is now possible to invent a method and suitable apparatus to engage in geophysical surveying and prospecting using seismoelectric signals instead of or in conjunction with seismic waves, with various benefits accruing as previously mentioned. Mathematical underpinnings for the method can now be derived.

Unlike a seismic wave, which can be detected by a geophone in one location, seismoelectric signals are detected using two electrodes and measuring the potential (voltage) across them.

Placement of the two electrodes is important. If one of the electrodes is placed far from the seismic source, and the other electrode inside of the seismic field, the inside electrode will reflect the point of electric potential change that corresponds to what a seismic geophone detects in terms of velocity and frequency. On the other hand, during a practical survey, if we put one electrode too far from the seismic source, the seismoelectric signal will be too weak to be measured.

It is preferable to place two electrodes inside of the seismic field. In this situation, the movements detected are different from those detected by a seismic geophone. While the seismic geophone detects movement only at the point where it is located, the two electrodes reflect the whole body movement where the whole body is assumed to be a half sphere with a diameter of the distance between the two electrodes. The streaming potential is measured at each time during the interval while the seismic wave travels from the first electrode to the second. During this time, the seismic wave is penetrating to successively deeper layers of the subsurface as the whole body hemisphere expands. Applying the Helmholtz seismoelectric formula to the whole body effect, and expressing it in terms of stress in the rock, yields:

$$E(t) = (\omega^2 \Delta \rho (P1(t) - P2(t)) \in \zeta)/(4\pi\eta\sigma) \quad \text{Eq. 1}$$

In which E is streaming potential, $\omega$ is the frequency of the seismic wave, $\Delta\rho$ is the density difference between the rock and the water, P1 and P2 are rock stresses of the seismic wave at electrodes 1 and 2, $\in$ is the permittivity of dielectric of the fluid, $\zeta$ is the zeta potential, $\eta$ is the viscosity and $\sigma$ is the fluid conductivity.

The term "low frequency" means frequencies under about 200 Hertz. For a low frequency seismic wave, the longer the finite distance between the electrodes, the deeper the penetration of the seismic wave which is generating the seismoelectric signals. This applies to both surface surveys and borehole surveys.

The force on a unit area of a rock cylinder, expressed as pressure P, produces a rock displacement u. According to Hook's law, these are related by the Lame constants. This displacement disturbs the double layer of electrical charges. The rock displaces the immobile layer in the water, which in turn displaces the diffuse layer. The streaming potential comes from this displacement, equivalent to the pressure of the water following the Helmholtz equation.

Two dimensional seismoelectric signal propagation equations in accordance with the stress-strain relation (Voigt's solid formula) can then be developed from the Helmholtz equation:

$$E(x12) = (\omega^2 \Delta \rho \in \zeta/(4\pi\eta\sigma))[\in_{xx}(e1) + \in_{zz}(e1) + \partial \in_{xx}(e1)/\partial t + \partial \in_{zz}(e1)/\partial t - \in_{xx}(e2) - \in_{zz}(e2) - \partial \in_{xx}(e2)/\partial t - \partial \in_{zz}(e2)/\partial t] \quad \text{Eq. 2}$$

$$E(z12) = (\omega^2 \Delta \rho \in \zeta/(4\pi\eta\sigma))[\in_{zz}(e1) + \in_{xx}(e1) + \partial \in_{zz}(e1)/\partial t + \partial \in_{xx}(e1)/\partial t - \in_{zz}(e2) - \in_{xx}(e2) - \partial \in_{zz}(e2)/\partial t - \partial \in_{xx}(e2)/\partial t] \quad \text{Eq. 3}$$

In which E(x12) is the streaming potential along the x axis between electrodes 1 and 2 and E(z12) is the streaming potential along the z axis between the same electrodes. In addition, $\in_{xx}(e1)$ is the displacement in the x direction along the x axis at electrode 1, $\in_{xx}(e2)$ is the displacement in the x direction along the x axis at electrode 2, $\in_{zz}(e1)$ is the displacement in the z direction along the z axis at electrode 1 and $\in_{zz}(e2)$ is the displacement in the z direction along the z axis at electrode 2. Partial derivatives of the displacement with respect to time are included, as are the same variables used in Equation 1. Use of these equations allows us to analyze a streaming potential signal in respect to time and arrive at the motions of the seismic wave which generated the streaming potential seismoelectric signal. Note that these equations are given in the two dimensional version, but the equivalent sets of equations for three dimensions can obviously be derived. It is also possible to reduce them back to the one dimensional versions and use that for some surveying.

Since the coupling of the layers can be done either using a spherical model or a cylindrical model, the velocity can be analyzed in terms of both the compression wave (P-wave) and the shear wave (S-wave) of the seismic wave.

The water table is a further important facet of seismoelectric prospecting. When a seismic wave propagates through the geological subsurface structures, the different impedance of the different layers will cause multi-reflections among them, as pointed out above. In particular, however, when the seismic wave travels to the surface of the earth, it will produce a seismoelectric signal at the water table.

When the water table is near the surface of the Earth, this seismoelectric signal can be captured with an antenna, eliminating the need for geophones fixed in solid contact with the earth. "Near" is defined to be no more than 5 meters using present day sensing technology.

When the water table is not near the surface but rather is below the surface, the antenna can be combined with geophone surveys of natural or artificial, seismic sources to determine the depth of the water table. The seismic wave will generate a seismoelectric signal as it crosses the water table. The difference in speed between the seismic wave traveling at its relatively slow speed and captured by a geophone, and the seismically induced electromagnetic field traveling at its much higher speed and captured by the antenna provides the depth of the water table, This is a second technique for use of the seismoelectric signal, again dependant upon the method of analyzing seismoelectric signals as being generated by the wave front of a seismic wave.

An alternative embodiment of the invention makes a three dimensional seismic survey taken at or above the surface with an antenna. Regardless of whether the seismic source is natural or artificial, around a water table there will be a seismoelectric effect that produces an electromagnetic signal which will, upon encountering the ground surface, propagate into the new medium of the atmosphere, just as it propagated into new layers of the crust. These signals can be captured with an antenna. Compared to the traditional method of surveying with a geophone, this method is greatly advantageous. First, a geophone collects only the seismic data at a single point, but as pointed out earlier, the antenna, like an electrode, gathers the seismoelectric signal. Second, a three component geophone array must be used to capture three dimensional seismic waves, which three recordings must then be compared in order to deduce the three dimensional structure of the seismic signal. The seismoelectric signal, radiating from the whole body surface of the hemisphere being traversed by seismic waves, shows the entire three dimensional data in a single pickup.

In addition, an antenna can be made much more portable than a geophone.

Apparatus for laboratory testing of the propagation of seismic waves and seismoelectric signals is shown in FIG. 1. Sample 102 is suspended by electrode 104 and electrode 106 from support 107, thus making the entire sample into a pendulum. Amplifier 108 receives and amplifies seismoelectric signals and passes them on to data acquisition device 110, which may be a computer, a tape recorder or other equivalents.

Figure 2:
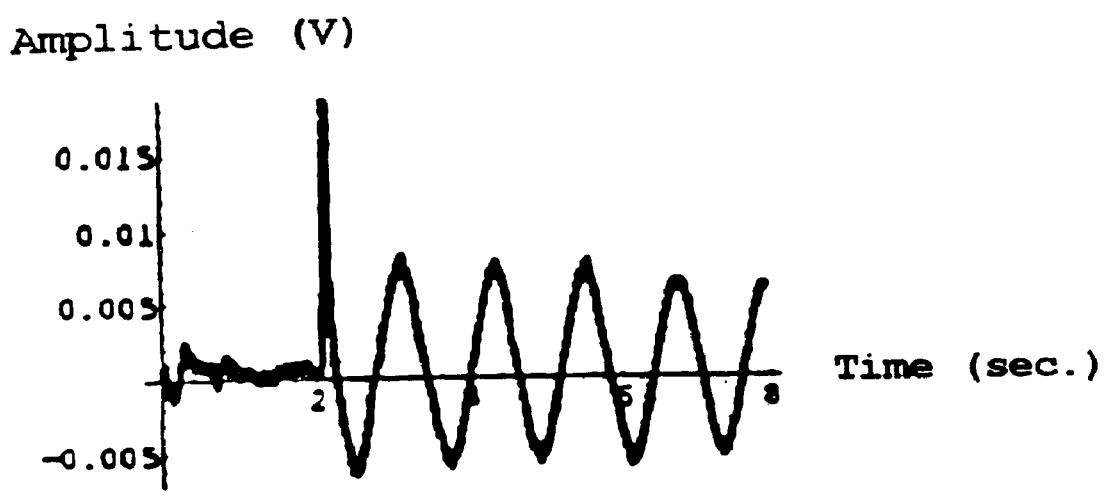
FIG. 2 is a graph showing the data generated by the apparatus of FIG. 1.
Figure 3:
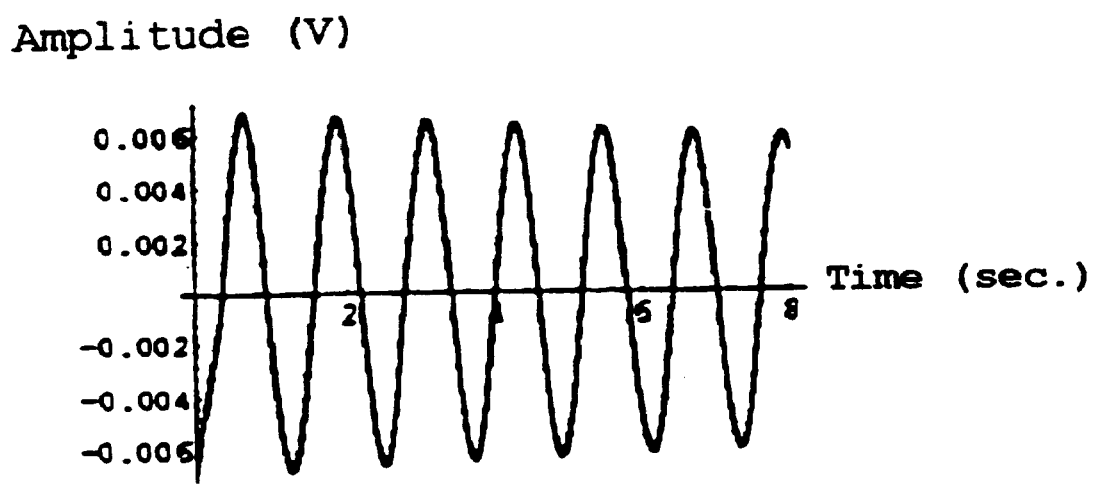
FIG. 3 is a graph showing an attenuating sine wave.
Figure 4:
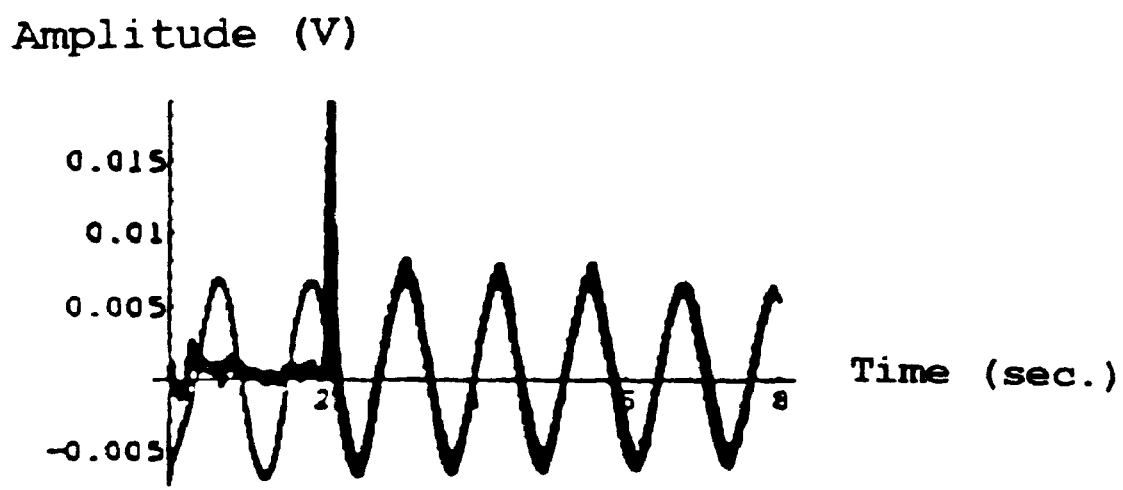
FIG. 4 is a graph showing the data generated by the apparatus of FIG. 1 superimposed onto the attenuating sine wave of FIG. 2.

FIG. 2 shows the data collected during the oscillation of sample 102. FIG. 3 shows an attenuating sine wave of the motion of a pendulum. FIG. 4 shows the data from FIG. 2, collected by oscillating sample 102, and the attenuating sine wave, superimposed. The curves match, showing that the seismoelectric signal is in fact due to the motion of the sample, and shares the frequency of the sample motion.

Figure 5:
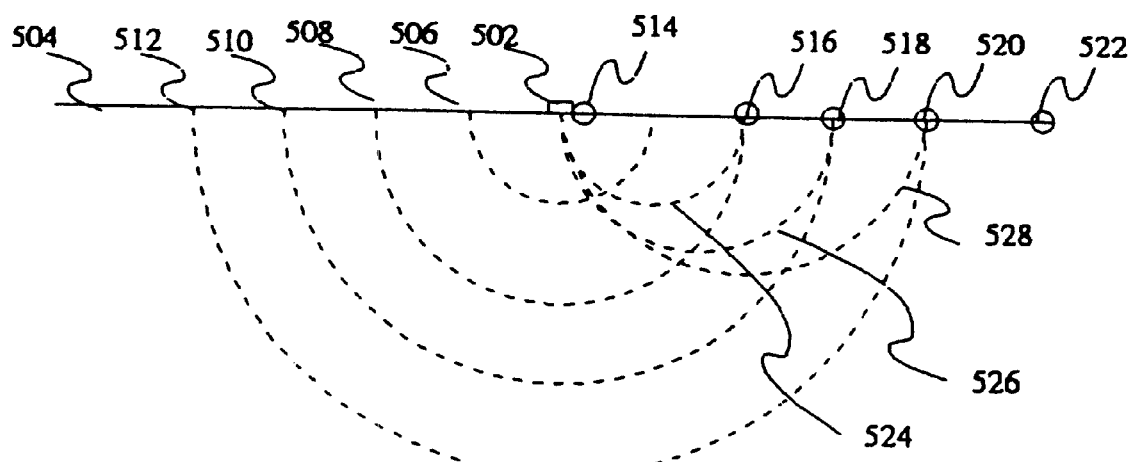
FIG. 5 is a diagram of the apparatus of the preferred embodiment of the invention for use in a seismoelectric signal surface survey, showing the equipotential and penetrability whole body volumes yielded by a seismoelectric survey.

Apparatus for surface surveying or prospecting using the method of the preferred embodiment of the invention is shown in FIG. 5. Seismic source 502 located on ground surface 504 produces seismic waves 506, 508, 510, and 512. Electrode 514 is positioned at seismic source 502, electrodes 516, 518, 520 and 522 are positioned, respectively, further away from seismic source 502. Not shown are data acquisition devices for capturing the steaming potential between each of the electrodes 516, 518, 520 and 522 and the seismic source electrode 514.

In practice, seismic source 502 produces seismic waves 506, 508, 510 and 512. These propagate, into the subsurface in roughly hemispherical form, slowing down and speeding up depending upon subterranean composition at any given point, and being reflected from certain types of subterranean features. As the waves spread out, they cause seismoelectric signals (not pictured) which radiate from every part of the moving seismic wave front. The location of the seismoelectric signals sources propagates with the moving seismic wave fronts, with the velocity and frequency of the seismic wave fronts. The seismoelectric signals themselves actually travel at their own quite high velocity. The array of electrodes 516, 518, 520 and 522 can map the location of the sources of the seismoelectric signals, as well as capturing frequency information, both of which are actually based upon the propagation of the triggering seismic waves.

Penetrability lines 524, 526 and 528 mark the furthest extent of depth penetration and reflection for, respectively, electrodes 516, 518, and 520. Note that each electrode does receive signals from each section of wave front of each of seismic waves 506, 508, 510, and 512, but the differing relative timing (dependant upon the speed of the seismic waves in the various materials) is illustrated by the penetrability lines 524, 526 and 528. Combining all the data gained yields the whole body data for the subterranean topology. The electrodes 516, 518, 520 and 522 are placed at a finite distance from the seismic source 502 and the seismic source electrode 514, such that they can detect the streaming potential generated by seismic waves originating at the seismic source 502. The greater the spacing of the electrodes, the deeper the penetration into the surface.

Figure 6:
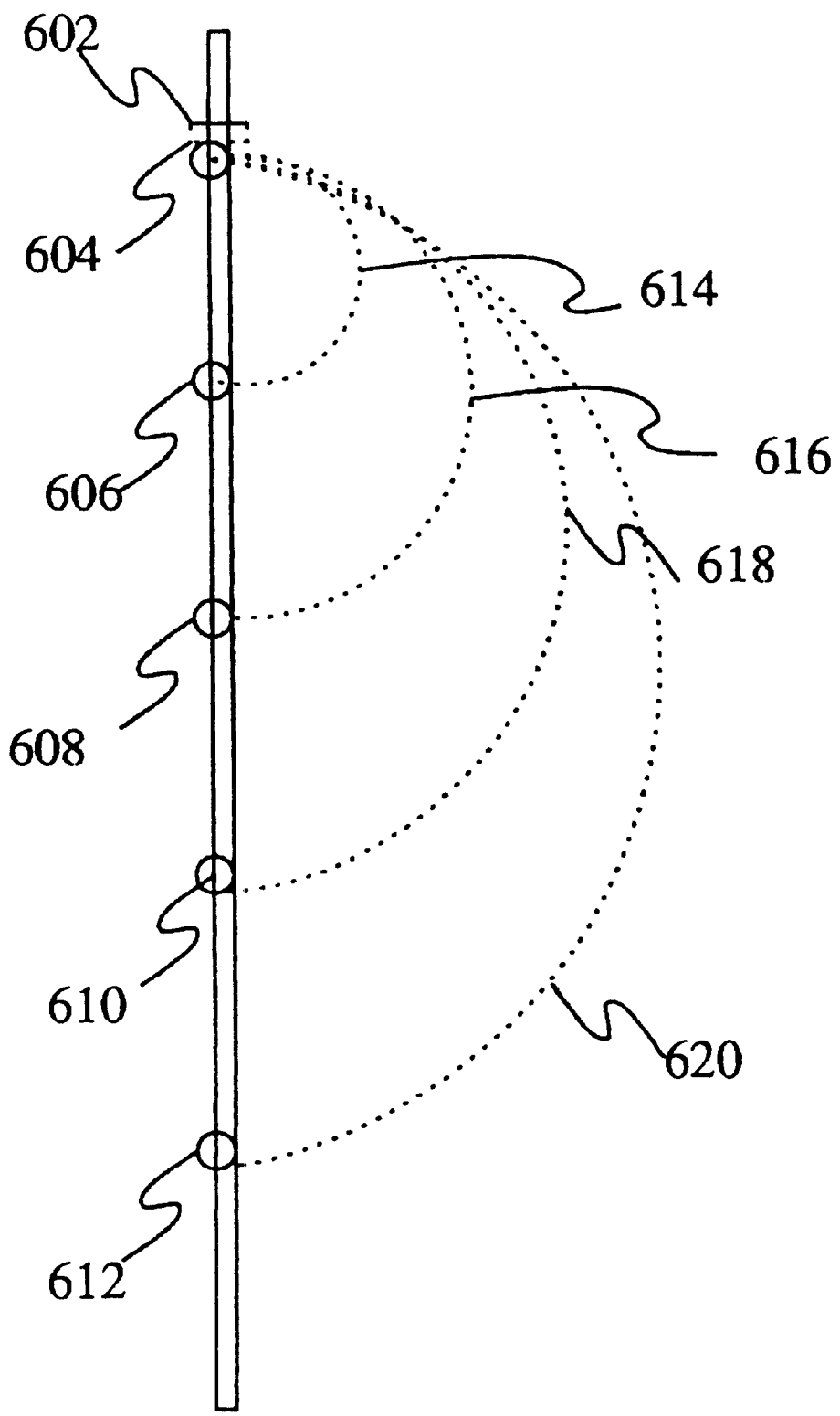
FIG. 6 is a diagram of apparatus of one alternative embodiment of the invention for conducting a seismoelectric survey in a borehole.

FIG. 6 illustrates the configuration for a survey, oriented in a vertical direction down a borehole, in a first alternative embodiment of the invention. Seismic source 602 produces seismic waves (not shown) which propagate through the earth materials matrix at their own comparatively low velocity. Electrodes 604, 606, 608, 610, and 612 are positioned so as to capture seismoelectric signals (not shown) triggered by the seismic waves as they pass through water saturated earth materials. Lines of penetrability 614, 616, 618, and 620 again mark the extent of depth penetration for each of electrodes 606, 608, 610, and 612 respectively. The greater the spacing of the electrodes, the deeper the penetrability from the wall of the borehole into the rock formation. Not shown are data acquisition devices for capturing the streaming potential in the time domain between each of the electrodes 606, 608, 610 and 612 and the seismic source electrode 604.

Seismic source 502 and seismic source 602 may be any of a variety of devices well known to those skilled in the art: explosives, noise makers, impact devices such as are often mounted on surveying trucks, and so on. Fabrication and use of electrodes 514, 516, 518, 520, 522, 604, 608, 610, and 612 is also well known to those skilled in the art.

EXAMPLE I

Figure 7:
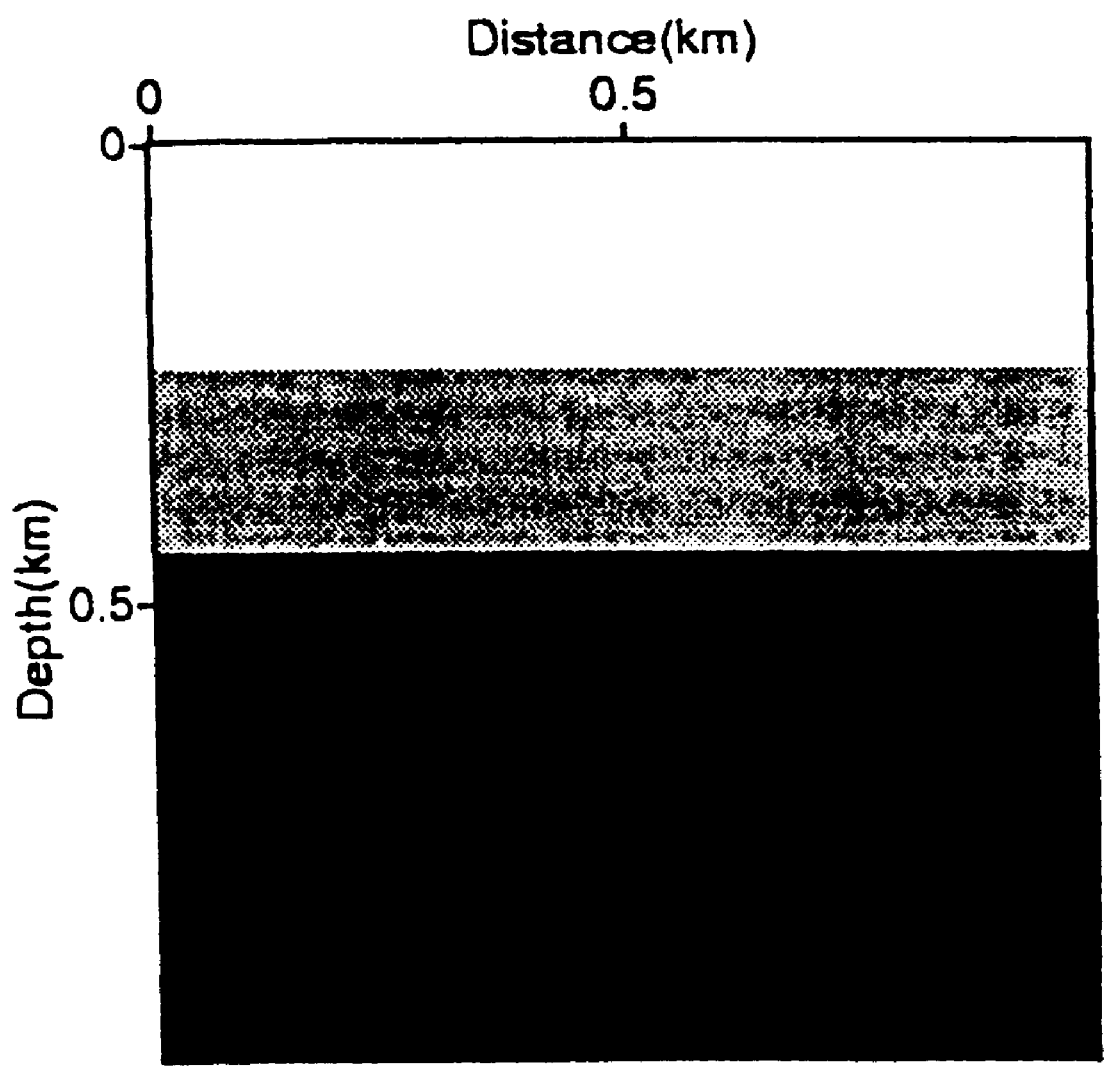
FIG. 7 is a two dimensional viscoelastic model of a geological formation having three layers.

The apparatus shown in FIG. 5, the preferred embodiment of the invention, is used to model a surface survey. In the model, the apparatus is altered by having a geophone positioned with each electrode. A two dimensional, three layer, viscoelastic medium model is used, as shown in FIG. 7, in which Vp1=2.0, Vp2=3.0, Vp3=8.0 where Vp is the velocity of compressional waves (P-wave) in each of the layers. Vs1=1.4, Vs2=1.8, Vs3=5.6, where Vs is the velocity of shear waves (S-waves) in each of the layers. Finally, pm1=0.1, pm2=0.2 and pm3=0.1 mD, where pm is permeability of each of the layers. Viscoelastic parameters are Vvp=0.01 and Vvs=0.01, for the P-waves and S-waves, in the top and bottom layers, and Vvp=Vvs=0.02 for the middle layer. Layers are numbered from the top down. Viscosity is 1.0, surface conductivity is 0.10 mhos M, and the dielectric permittivity of the liquid is a constant (theoretically 8.85 times 10 the 12th power F/m.) Zeta potential waves with permeability.

Figure 8:
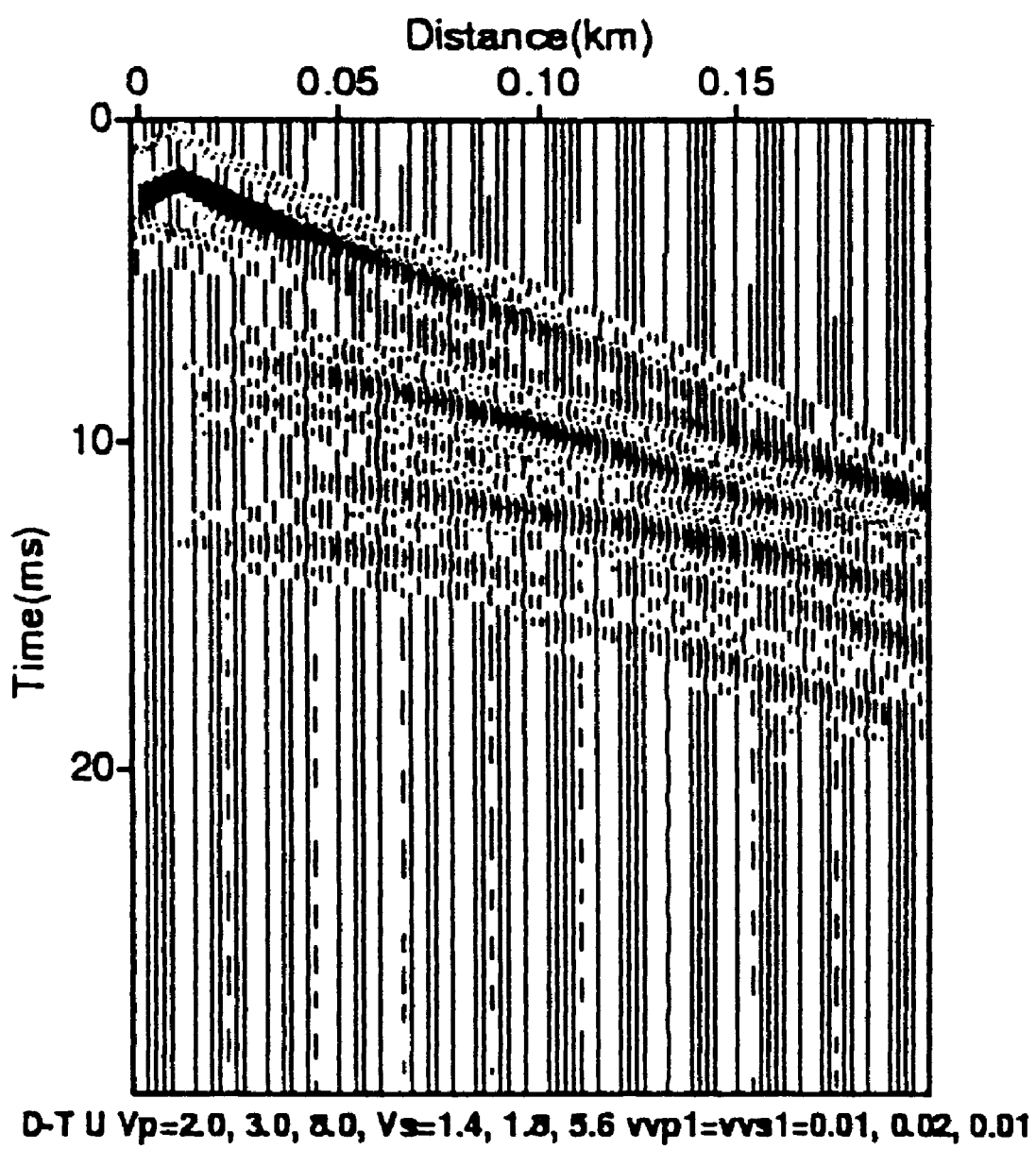
FIG. 8 is a graph of a U-component of a seismic wave model whose source is located in the top left of FIG. 7.
Figure 9:
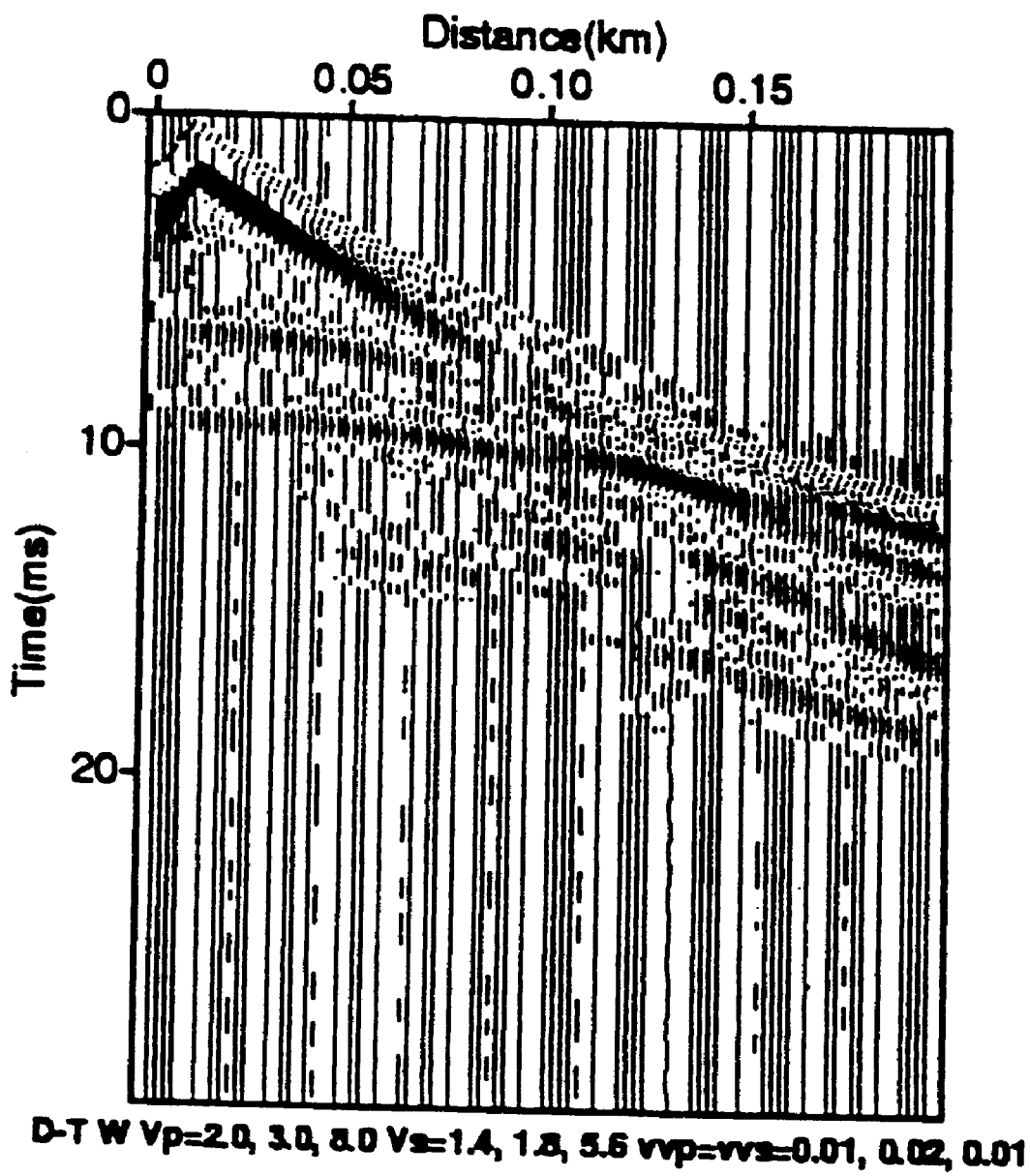
FIG. 9 is the graph of a W-component of a seismic wave model whose source is located in the top left of FIG. 7.

The artificial seismic source is located near the top left of the survey model. To simplify the problem, tube waves are ignored. Results are shown in FIG. 8 through FIG. 11. FIG. 8 shows the U component (vertical) of the seismic signals, FIG. 9 the W component (horizontal) of the seismic signals. For the seismic signal, the wave fronts shown in the necessarily small FIG. 8 and FIG. 9 are 0.012 in the seismic signal and 0.06 second in the seismoelectric signals.

Figure 10:
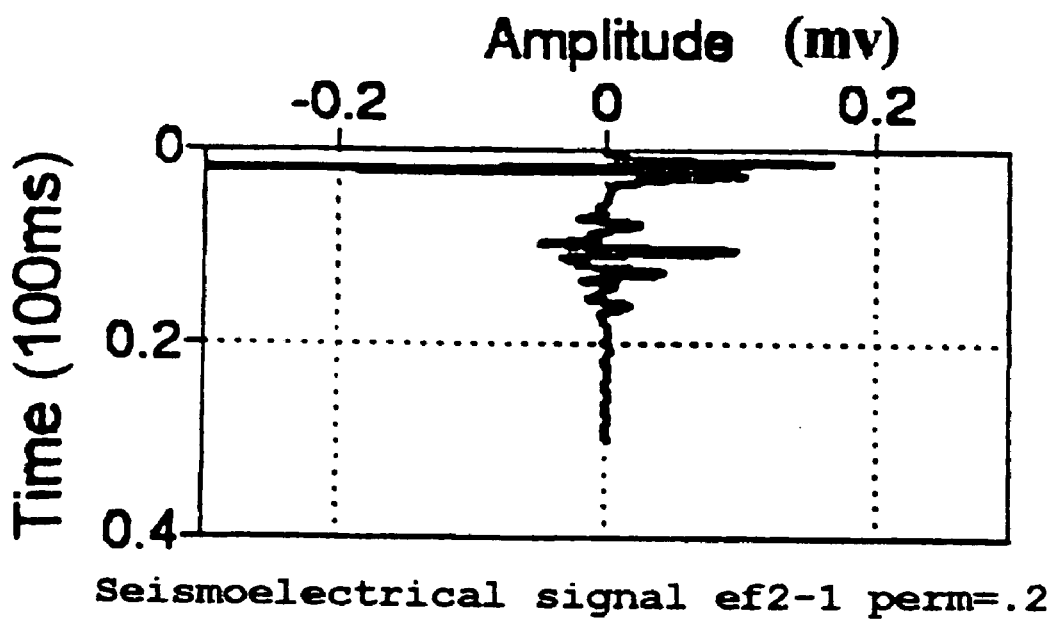
FIG. 10 is a graph of data from a seismoelectric signal model generated by a seismic signal source located in the top of the second layer of FIG. 7, measured between two electrodes of FIG. 1, spaced 0.1 km apart.
Figure 11:
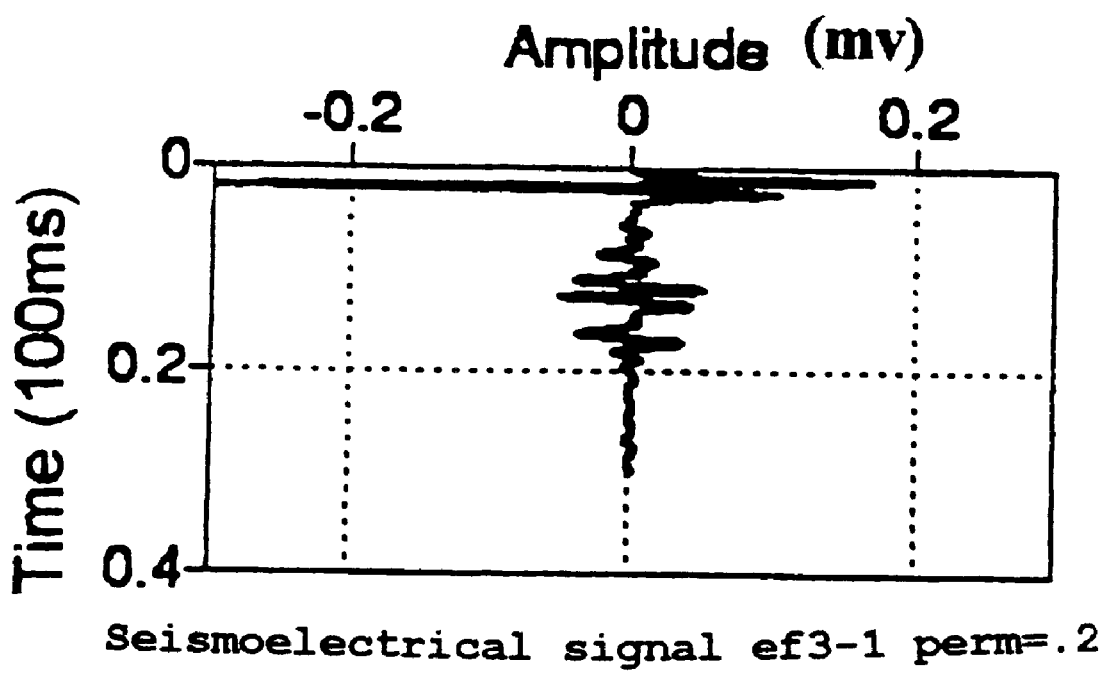
FIG. 11 is a graph of data from a seismoelectric signal model generated by a seismic signal source located in the top of the second layer of FIG. 7, measured between two electrodes of FIG. 1, spaced 0.5 km apart.

For FIG. 10 and FIG. 11 the spacing of the electrodes is increased, as the propagation theory of seismoelectric signals shows that measuring depth depends upon electrode spacing. In a practical surface survey, penetration depth will depend upon electrode spacing. In a practical borehole well log, invasion zone surveying is one important method of characterizing the target layer. Thus by using different electrode spacing, the different depths of the layers can be used to gain more information about the invasion zone or the area surveyed. The finite distances in this example are 160 meters between electrodes 514 and 520, 200 meters between electrodes 514 and 522.

For clarity, the seismoelectric signals are amplified by a gain of four times in amplitude. In the surface survey, the surface seismic wave is much stronger than the waves produced by reflections and refractions caused by subsurface topology, and the seismoelectric signals mirror this effect faithfully. The seismoelectric signals produced by seismic waves can be separated as to origin in surface, reflected or refracted waves based on their different velocities, much as seismic waves always are, as is known to those skilled in the art. The net result, however, is the acquisition of further information about subsurface features.

FIG. 10 is a graph which shows the seismoelectric signal (the streaming potential) measured between electrodes 514 and 520, 160 meters apart. The attenuating sine wave of the seismic signal from FIG. 8 and FIG. 9 is clearly visible in the seismoelectric signal. FIG. 11 graphs the seismoelectric signal measured between electrodes 514 and 522, 200 meters apart. Again, the attenuating sine wave of the seismic signal is clearly visible. Thus, we see that the seismic signal is paralleled by the much easier to measure seismoelectric signal.

The reflection information on the seismic wave as it crosses the boundaries of different layers is thus captured with considerable ease in the form of seismoelectric signals. In addition, the seismoelectric signals contain permeability information.

The simple traces shown in FIG. 10 and FIG. 11 can then be translated to obtain the parameters of the various layers, in a simple process inverse to that used to generate the graphs shown. This inverse process is used for traditional geophone surveys.

Figure 12:
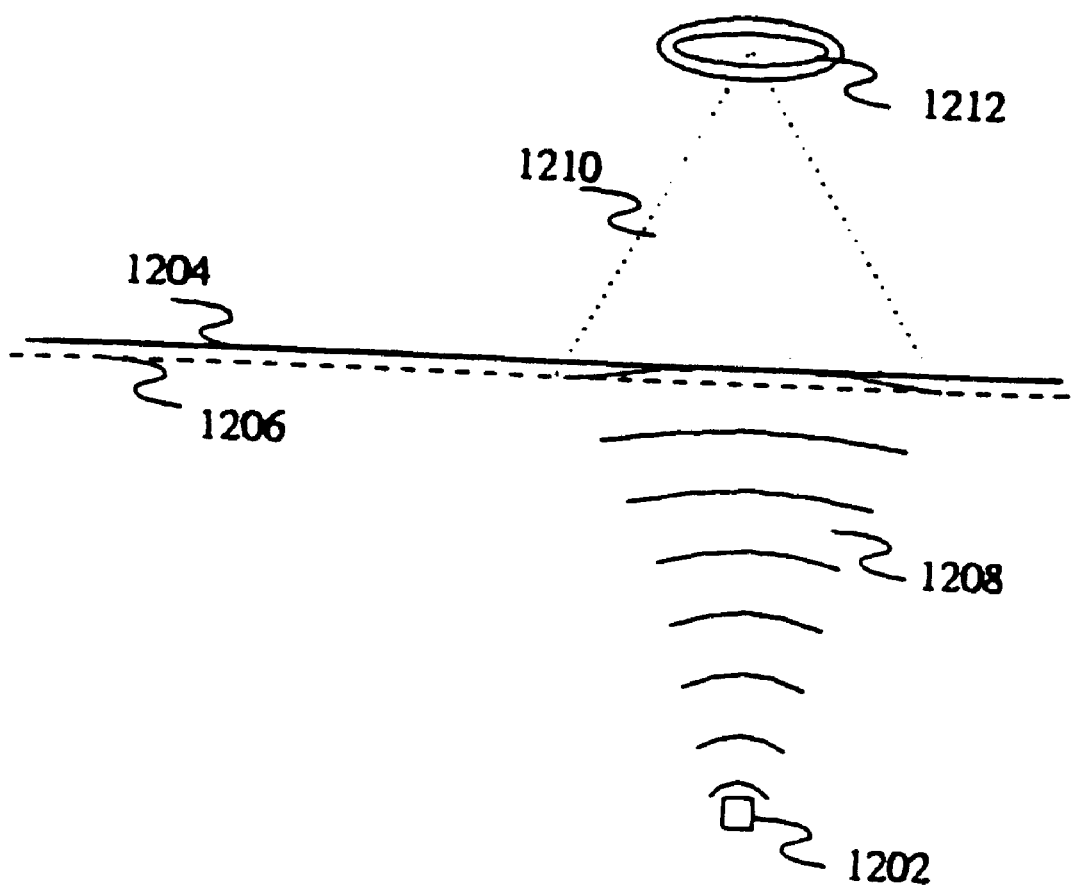
FIG. 12 is a diagram showing seismic signals emanating from a natural underground source and through the Earth's crust, generating seismoelectric signals at the water table which in turn induce an electromagnetic field captured by an antenna in another alternative embodiment of the invention.

FIG. 12 shows an alternative embodiment of the invention in which natural seismic source 1202 is used in place of an imposed seismic source. Ground surface 1204 is closely underlaid by water table 1206. Seismic signal 1208 propagates through the subsurface, and upon encountering water table 1206, it is propagated upwards as seismoelectric signals 1210, which can be captured with antenna 1212. This method allows capture of the whole body data and yet requires no fixed geophones, and even eliminates the need for electrodes as used in other embodiments. The practicality of capturing seismoelectric signals in areas where water table 1206 and ground surface 1204 are quite close has been known in the art, however, a method of use of these seismoelectric signals for mapping of seismic signals, and thus for prospecting, has not been known.

EXAMPLE II

As mentioned above, natural seismic sources include the earth's rotation, earthquakes, tidal movements and others. All these movements produce seismic waves and the seismic waves in turn produce seismoelectric signals.

A natural seismic source is analytically equivalent to an imposed source which is located at the bottom of the model.

Figure 13:
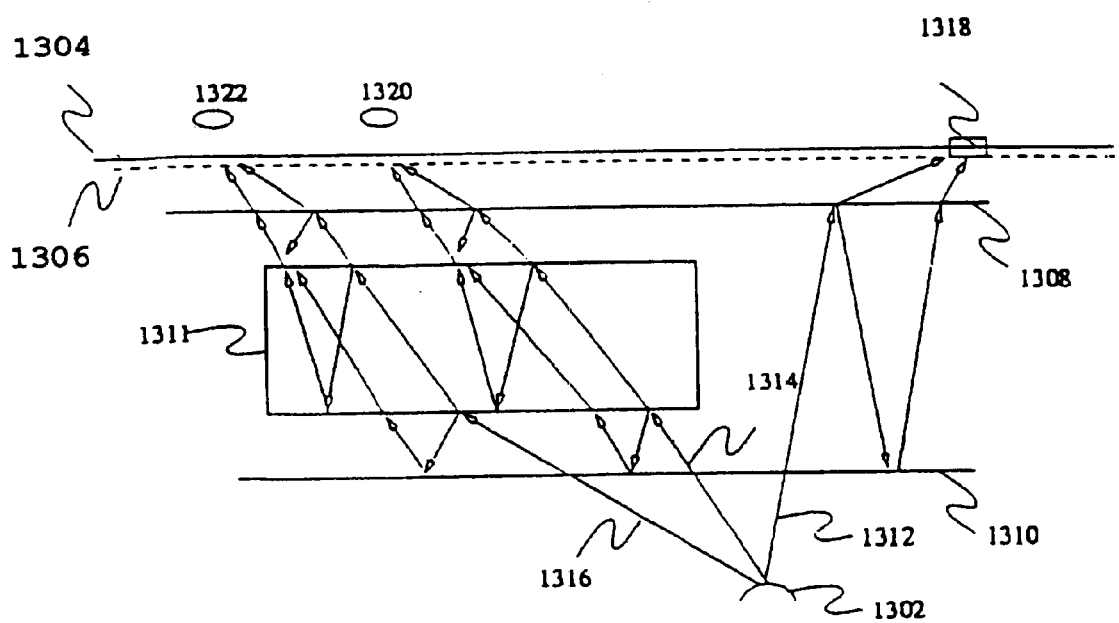
FIG. 13 is a diagram showing seismic waves emanating from a natural underground source and reflecting within the subsurface structures before being captured by seismoelectric receivers in another alternative embodiment of the invention.

As shown in FIG. 13, a second alternative embodiment of the invention, natural seismic source 1302 is located at the bottom of a theoretical terrain having ground surface 1304, water table 1306, first geological boundary 1308 and second geological boundary 1310, and geological anomaly 1311, which is the "target" of interest in the survey. Natural seismic source 1302 emits seismic signals 1312, 1314 and 1316, which are shown reflecting and refracting as they progress towards ground surface 1304, where the signals are captured by reference receiver 1318 and by first receiver 1320 and second receiver 1322.

First receiver 1320, second receiver 1322, and reference receiver 1318 can be geophones directly picking up the seismic signal, as is known in the art, or in accordance with the invention they may be electrodes capturing seismoelectric signals radiated by the seismic signals as they propagate through the Earth's crust, or they may be both.

Reference receiver 1318 provides a control signal, showing the geotelluric signal, the telluric signal from the solar wind, and other sources of electrical signals which must be canceled out for accurate surveying. The signals from reference receiver 1318 can be removed from the signals from first receiver 1320 and second receiver 1322 to derive a time and amplitude plot of the effect of geological anomaly 1311 upon seismic signals 1314 and 1316.

This use of a natural seismic source is modeled, as per the previous example I, using the same model given in FIG. 7 and the apparatus of FIG. 5, without seismic source 502. Instead, the natural seismic source is equivalent to an artificial seismic source located at the bottom middle of the geological model.

Figure 14:
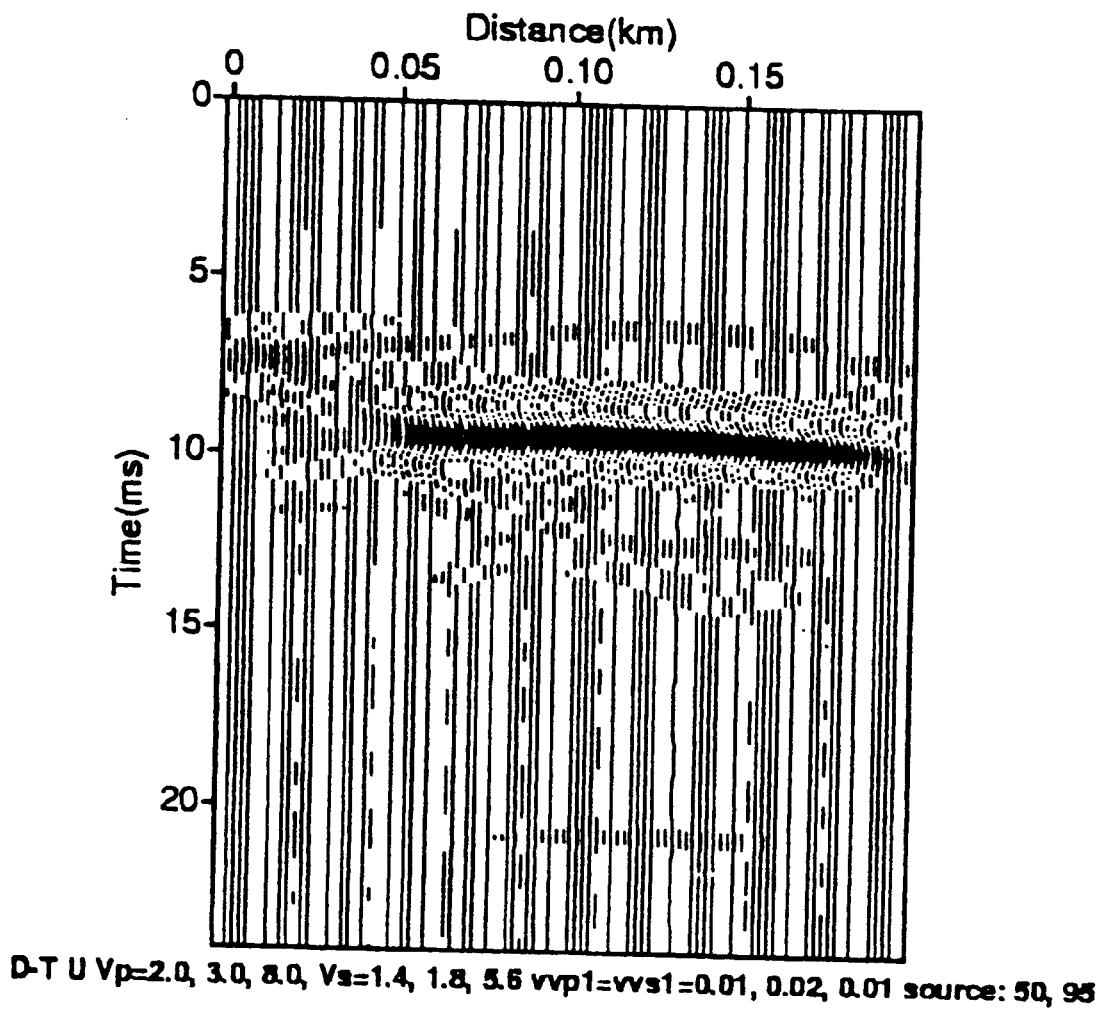
FIG. 14 is a graph of a U component, two dimensional seismic wave model of data taken from the three layer model in FIG. 7, using the apparatus of FIG. 5 in a surface survey using a natural seismic wave source located at the bottom of the model.

FIG. 14 is a graph of the U component of seismic waves gathered by the surface survey apparatus used in the previous example, but without any artificial, imposed, seismic source.

Figure 15:
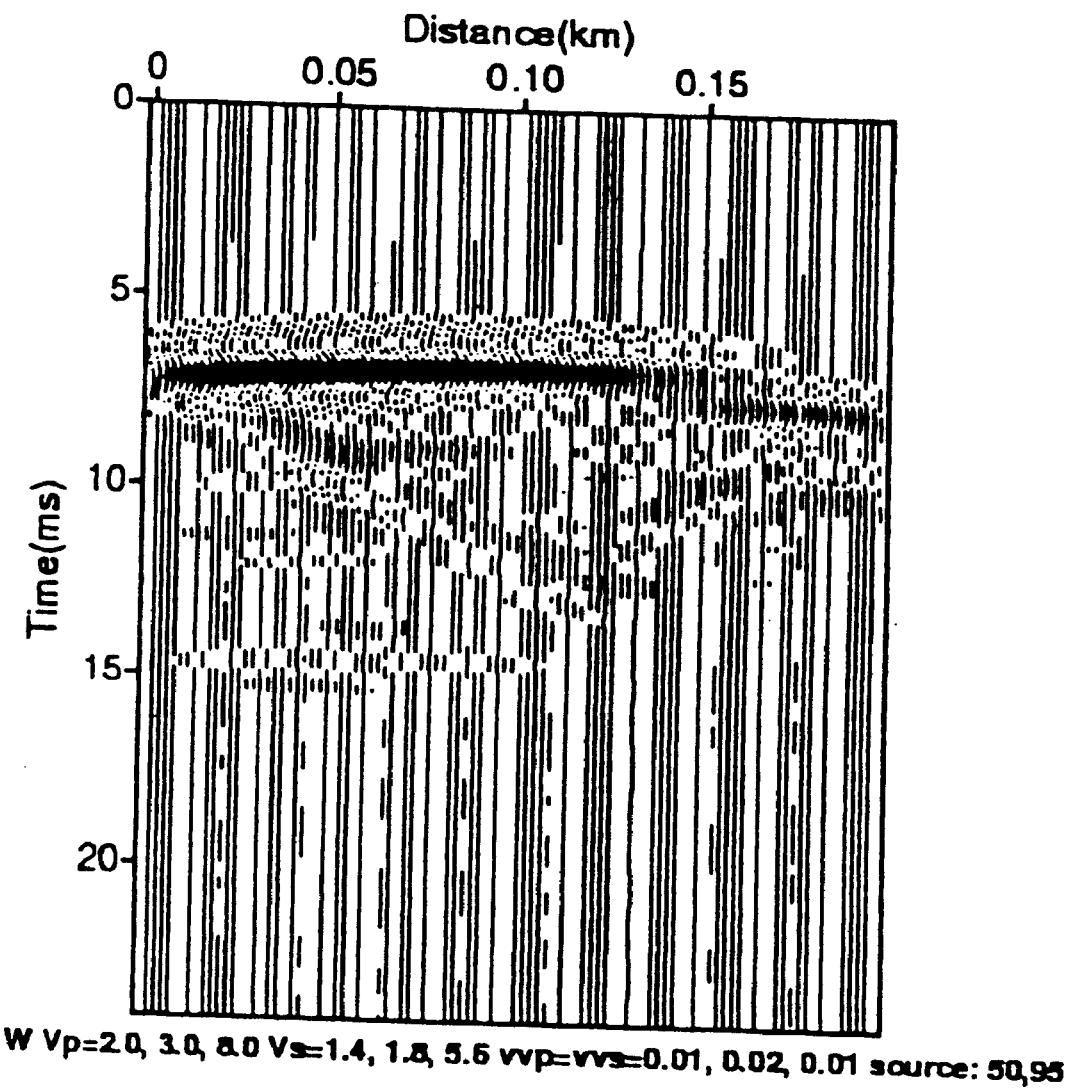
FIG. 15 is a graph of a W component, two dimensional seismic wave model of data taken from the three layer model in FIG. 7, using the apparatus of FIG. 5 in a surface survey using a natural seismic wave source located at the bottom of the model.

FIG. 15 is a graph of the W component of seismic waves gathered by the surface survey apparatus used in the previous example, but without any artificial, imposed, seismic source.

Figure 16:
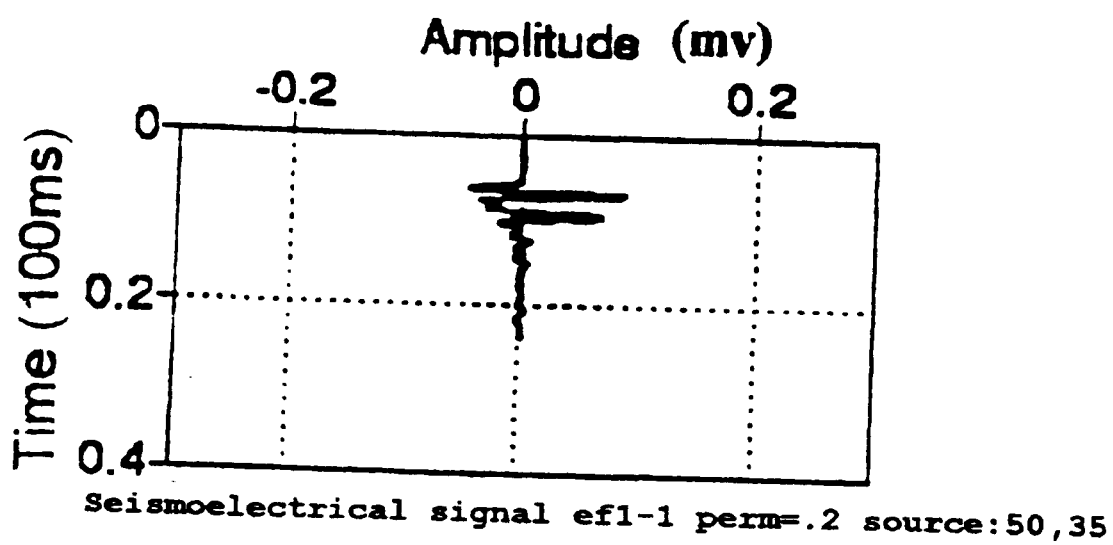
FIG. 16 is a graph of data from a seismoelectric signal model measured between two electrodes of the preferred embodiment of the invention from FIG. 5 in a surface survey per FIG. 14 and FIG. 15.

FIG. 16 is a graph of the seismoelectric signal measured between electrodes 514 and 516 used in this example II, and respectively corresponding to reference receiver 1318 and first receiver 1320 of FIG. 13, showing that it again closely corresponding to the signals from the seismic waves on the previous two graphs.

Figure 17:
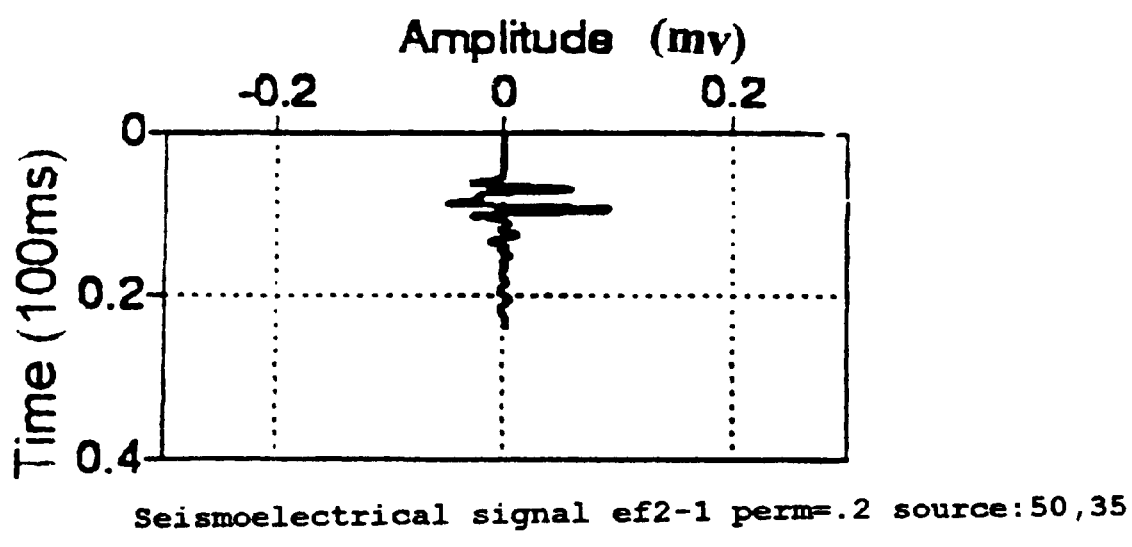
FIG. 17 is a graph of data from a seismoelectric signal model measured between two more widely separated electrodes of the preferred embodiment of the invention from FIG. 5 in a surface survey per FIG. 14 and FIG. 15.

FIG. 17 is a graph of the seismoelectric signal measured between electrodes 513 and 518 used in this example II and respectively corresponding to reference 1318 and second receiver 1322 if FIG. 13, showing that it also closely corresponds to the signal from the seismic waves in the previous two graphs.

The seismic geophones and seismoelectric electrodes are placed on the surface as in example I. Once again, interpretation of the signals gathered is conducted according to numerical methods: the seismoelectric signals are used to calculate the subsurface geology, the inverse of the modeling process.

EXAMPLE III

When the water table is not near to the surface of the earth, combining the seismoelectric signal and the seismic wave information will determine the depth of the water table, using either a natural or artificial seismoelectric source.

Figure 18:
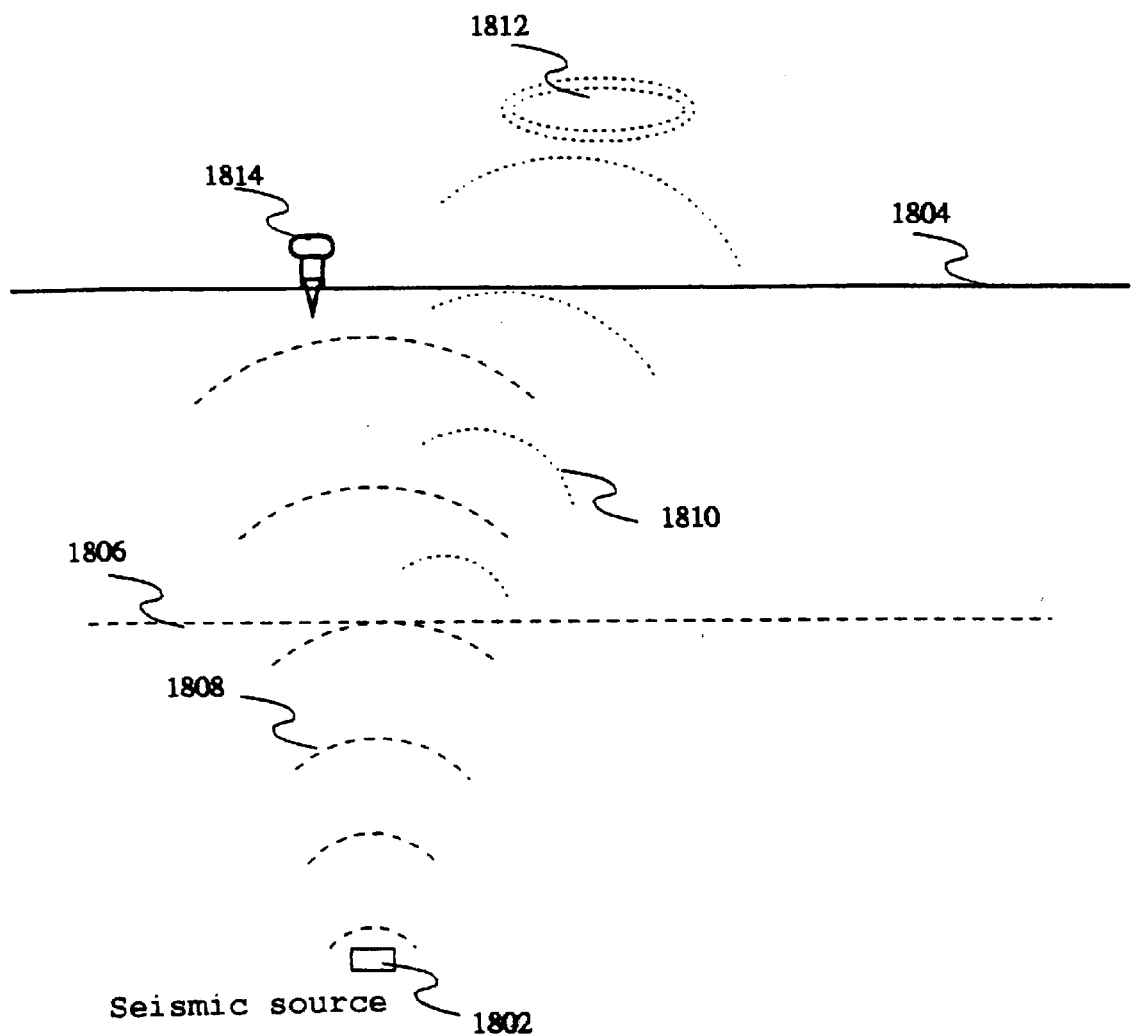
FIG. 18 is a diagram showing seismic signals emanating from an underground seismic source and producing seismoelectric signals which produce a secondary electromagnetic field in turn captured by seismoelectric receivers in another alternative embodiment of the invention used to determine the depth of the water table.

FIG. 18 shows this method. Natural seismic source 1802 is located under ground surface 1804, and at an undetermined level in between is water table 1806. Seismic wave 1808 propagates upwards through water table 1806, generating a seismoelectric signal which in turn generates electromagnetic signal 1810, which continues into the atmosphere where it is captured by antenna 1812. Seismic wave 1808 is captured by seismic geophone 1814.

The seismoelectric signal induces a secondary electromagnetic field which will travel with a velocity circa 300,000 km/s, while the seismic signal will travel with a velocity circa 1 km/s. Note that both of these velocities depend upon the characteristics of the local subsurface structures. The time difference between the arrival of the two signals then provides a simple method for calculating the depth of the water table.

The above invention has been disclosed in both preferred and alternative embodiments in order to enable one skilled in the art to practice it. While numerous details have been set forth for illustrative purposes, it will be obvious to those skilled in the art that the invention is susceptible to many equivalents, substitutions, and alterations without departing from the essential spirit of the invention. Nothing in the foregoing disclosure is to be taken to limit in any way the scope of the invention, which is to be understood only on the basis of the following claims.

What is claimed is:

1. A method of borehole surveying of geological structures in water saturated media, comprising the steps of, generating a low frequency seismic wave, measuring streaming potential in the time domain between a seismic source electrode operatively connected to the crust of the Earth at the location of the seismic wave generation and at least one receiving electrode operatively connected to the crust of the Earth at a finite distance from the location of the seismic wave generation, wherein said at least one receiving electrode is disposed down such borehole, and analyzing said steaming potential to determine multidimensional propagation of said seismic wave with respect to time.

2. A method of laboratory analysis of water saturated geological samples, comprising the steps of:

suspending a geophysical sample so as to form a pendulum, attaching a plurality of electrodes to said geophysical sample, inducing a oscillation in said geophysical sample, so as to induce streaming potential in said geophysical sample, measuring in the time domain streaming potential between said plurality of electrodes, and calculating from said streaming potential vibratory motions within said geophysical sample.

3. Apparatus for borehole surveying of underground geological structures comprising:

a seismic source, for generating a low frequency seismic wave, at least one seismoelectric signal receiver comprising a seismic source electrode operatively connected to the crust of the Earth at the location of said seismic wave source and at least one receiving electrode operatively connected to the crust of the Earth at a finite distance from said seismic wave source, wherein said at least one receiving electrode is disposed within such borehole, and at least one potentiometer, operatively connected to said seismoelectric signal receiver, for capturing streaming potential generated by said seismic wave's multidimensional propagation in the time domain.

4. The apparatus according to claim 3, wherein said seismic source and said seismic electrode are disposed within said borehole.

5. An improved method of surveying using geophones in regions having water saturated media, in which the improvement comprises the steps of:

operatively connecting a plurality of electrodes to the Earth's crust, while taking readings from said geophones, measuring streaming potential generated by the multidimensional propagation of a seismic wave in the time domain between said plurality of electrodes, and analyzing said streaming potential to determine multidimensional seismic propagation and partial derivatives of seismic propagation with respect to time.

6. A method for laboratory analysis of water saturated geophysical samples, comprising the steps of:

attaching a plurality of electrodes to said geophysical sample, inducing an oscillation in said geophysical sample, so as to induce streaming potential in said geophysical sample, measuring in the time domain streaming potential between said plurality of electrodes, and calculating from said streaming potential vibrations within said geophysical sample.

7. An improved method of surveying in regions having water saturated media, in which the improvement comprises the steps of:

measuring in an aerial antenna streaming potential in the time domain, and analyzing said streaming potential to determine multidimensional seismic propagation with respect to time.

8. An improved method of surveying in regions having water saturated media, in which the improvement comprises determination of permeability by the steps of:

placing an antenna at the survey location, measuring said antenna streaming potential in the time domain, and analyzing said streaming potential as a function of rock stress to determine permeability of geological formations.

9. An improved method for geological surveying in water saturated media, comprising the steps of:

measuring in the time domain streaming potential generated by multidimensional propagation of a seismic wave, analyzing said streaming potential as a function of rock stress to determine therefrom multidimensional seismic wave propagation.

10. The improved method of claim 8 wherein the step of analyzing said streaming potential further comprises analyzing streaming potential in the time domain as a function of rock stress to determine therefrom permeability.

11. The improved method of claim 10, wherein the function of streaming potential in the time domain to rock stress takes the form: $E(t)=f(\omega, \rho, P(t), \zeta, \in, \eta, \sigma)$, wherein $E(t)$ is streaming potential with respect to time, $f$ is the function, $\omega$ is the frequency of said seismic wave, $\rho$ is the density difference between the water and said media, $P(t)$ the rock stresses with respect to time, $\zeta$ the zeta potential, $\in$ the permittivity of the fluid, $\eta$ the viscosity of the fluid, and $\sigma$ the fluid conductivity.

12. The method of multidimensional surveying of geological structures in water saturated media of claim 9, wherein the function of streaming potential in the time domain to rock stress takes the form: $E(t)=f(\omega, \rho, P(t), \zeta \in, \eta, \sigma)$, wherein $E(t)$ is said streaming potential with respect to time, $f$ is said function, $\omega$ is the frequency of said seismic wave, $\rho$ is the density difference between the water and said media, $P(t)$ the rock stresses with respect to time, $\zeta$ the zeta potential, $\in$ the permittivity of the fluid, $\eta$ the viscosity of the fluid, and $\sigma$ the fluid conductivity.

13. A method of surveying of geological structures in water saturated media, comprising the steps of:

generating a low frequency seismsic wave, measuring streaming potential in the time domain, and analyzing said streaming potential in the time domain as a function of rock stress to determine therefrom multidimensional seismic wave motions.

14. The method of multidimensional surveying of geological structures in water saturated media of claim 13, wherein the function of streaming potential in the time domain to rock stress takes the form: $E(t)=f(\omega, \rho, P(t), \zeta, \in, \eta, \sigma)$, wherein $E(t)$ is streaming potential with respect to time, $f$ is the function, $\omega$ is the frequency of said seismic wave, $\rho$ is the density difference between the water and said media, P(t) the rock stresses with respect to time, $\zeta$ the zeta potential, $\in$ the permittivity of the fluid, $\eta$ the viscosity of the fluid, and $\sigma$ the fluid conductivity.

15. Apparatus for surveying of underground geological structures comprising:

a seismic source, for generating a low frequency seismic wave, at least one antenna, and at least one potentiometer, operatively connected to said antenna, for capturing streaming potential generated by said seismic wave's multidimensional propagation in the time domain.

16. The apparatus of claim 15, wherein said antenna comprises an aerial antenna.

* * * * *